United States Patent [19]

Pipkin et al.

[11] Patent Number: 4,950,933

[45] Date of Patent: Aug. 21, 1990

[54] CARBON BRUSH HOLDER UTILIZING A WORN BRUSH DETECTOR

[75] Inventors: James R. Pipkin, Orlando; Edward D. Thompson, Casselberry, both of Fla.

[73] Assignee: Westinghouse Electric Corp., Pittsburgh, Pa.

[21] Appl. No.: 388,890

[22] Filed: Aug. 3, 1989

[51] Int. Cl.[5] .............................................. H02K 13/00

[52] U.S. Cl. ...................................... 310/239; 310/219; 310/242; 310/248

[58] Field of Search ................ 310/219, 232, 239–242, 310/243–248, 42

[56] References Cited

U.S. PATENT DOCUMENTS

| | | | |
|---|---|---|---|
| 2,840,732 | 9/1956 | Nottelmann | 310/239 |
| 3,387,155 | 6/1968 | Krulls | 310/239 |
| 3,710,478 | 1/1973 | Krulls et al. | 310/239 |
| 3,968,391 | 7/1976 | Blank | 310/245 |
| 4,166,227 | 8/1979 | Guglielmo | 310/245 |
| 4,344,008 | 8/1982 | Major | 310/242 |
| 4,344,009 | 8/1982 | Reynolds | 310/242 |
| 4,348,608 | 9/1982 | Michael | 310/242 |
| 4,366,404 | 12/1982 | Ziegler | 310/239 |
| 4,488,078 | 12/1984 | Orton | 310/242 |
| 4,513,495 | 4/1985 | Kimberlin | 310/242 |
| 4,713,566 | 12/1987 | Moore et al. | 310/239 |
| 4,723,084 | 2/1988 | Reynolds | 310/242 |
| 4,739,208 | 4/1988 | Kimberlin | 310/242 |
| 4,743,787 | 5/1988 | Bunner | 310/242 |
| 4,831,302 | 5/1989 | Dietrich | 310/245 |

FOREIGN PATENT DOCUMENTS

| | | | |
|---|---|---|---|
| 0049067 | 3/1983 | Japan | 310/239 |
| 1219096 | 1/1971 | United Kingdom | 310/239 |

*Primary Examiner*—R. Skudy

*Attorney, Agent, or Firm*—Michael G. Panian

[57] ABSTRACT

A worn brush detector 43 for an electric generator. The worn brush detector 43 comprises a contactor strip 55 of electrically-conductive material secured to and insulated from a brush holder 28, the contactor strip 55 having a plurality of fingers 52 projecting downward from the strip 55 and generally perpendicular thereto, the fingers 52 being disposed adjacent to a hole 62 in the brush holder 28 and electrically insulated therefrom. An electrically insulated knob 61 on the opposite end of the fingers 52 projects through the hole 62 such that when a brush 25 is inserted into the holder 28 the corresponding finger 52 is pushed away from the holder by the knob 61 contacting the brush 25. When one of the brushes 25 has worn down a predetermined amount the brush 25 is disengaged from the knob 61 so that the corresponding finger 52 is caused to contact the holder 28 to generate an electrical signal. Light emitting diodes 76, electrically connected to each of the holders 28, is illuminated to indicate when a brush holder 28 having a worn brush 25 has been detected.

12 Claims, 5 Drawing Sheets

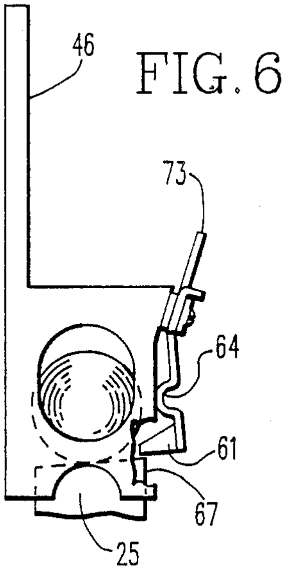
FIG. 6
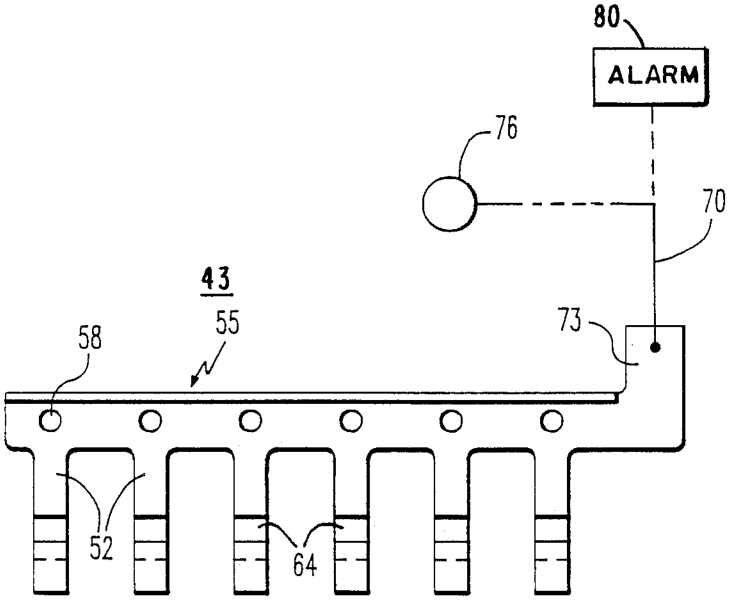
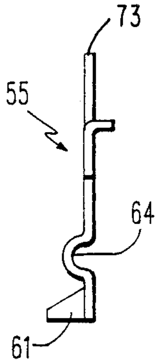
FIG. 8
FIG. 7

CARBON BRUSH HOLDER UTILIZING A WORN BRUSH DETECTOR

TECHNICAL FIELD

The invention relates to a magazine-type brush holder for carbon brush current collection systems, and more particularly to an improved brush holder having a worn brush detector.

BACKGROUND OF THE INVENTION

In certain high speed rotating equipment with static excitation, such as large turbine-generator systems, carbon brush current collection systems are utilized to conduct a field current to the generator rotor. The collector sets typically comprise a pair of collector rings, or one for each pole, mounted on the rotor and a set of stationary brushes angularly displaced around, and in contact with, each collector ring. In order to protect the collector sets and to prevent inadvertent contact with them by personnel, the collector sets are enclosed within an enclosure which includes a fixed base. This enclosure is commonly referred to as a collector house. Typically the collector house includes stationary traverse end walls having sealed openings through which the rotor shaft passes and a house defining the roof and sidewalls of the enclosure. In some installations, it is desirable to be able to change the brushes without shutting the generator down. Accordingly, the housing is provided with doors through which access may be gained to the collector set.

Because of high demands, it is common to arrange a plurality of carbon brushes within a magazine-type brush holder. Several brushes, typically about six, are grouped within the brush holder which are arranged around the outside diameter of the generator rotor. Examples of such brush holders are described in U.S. Pat. No. 3,387,155, issued on June 4, 1968, and U.S. Pat. No. 3,710,478 which issued on Jan 16, 1973.

While these devices permit ease of brush replacement, it must first be determined when one or more brushes has become worn to the point that it must be replaced. Typically, this is done by a visual inspection of the brushes on a periodic basis. The collector environment inside the house is relatively noisy, and contains high speed rotating equipment operating at high voltages. Thus, an inspector, in order to visually inspect for worn brushes, must enter a relatively hostile environment while the generator is .operating. Such inspections are done while the generator is on-line, in order to minimize the costly down time of the power generation system. What is needed then is a device whereby a worn brush condition can be indicated to an operator located at a remote location, to obviate the need of placing maintenance personnel within the collector house to conduct brush inspections while the generator is on-line.

DISCLOSURE OF THE INVENTION

It is therefore an object of the present invention to provide a means of remotely detecting when a carbon brush used within a current collector is worn beyond its useful length.

It is another object of the present invention to indicate to an operator the location of a brush holder having the worn brush.

The above objects are obtained by the present invention, according to which, briefly stated, in a dynamoelectric machine having a rotatable shaft, one or more collector rings axially spaced on the shaft and rotatable therewith, and a plurality of stationary carbon collector brushes angularly supported about the collector rings and in sliding contact therewith, the brushes are grouped within a plurality of removable holders such that a portion of the brushes are singularly removable from contact with the collector rings. Means for detecting when at least one of the group brushes within one of the removable holders has been worn down a predetermined amount are included.

BRIEF DESCRIPTION OF THE DRAWINGS

Various other objects, features, and advantages of the invention will become more readily apparent by reading the following detailed description in conjunction with the drawings, which are shown by way of example only, wherein:

FIG. 6 is a side view of a brush box with a worn brush; and

FIG. 7 is a view of a typical contactor strip of the present invention.

DESCRIPTION OF THE PREFERRED EMBODIMENTS

Figure 1:
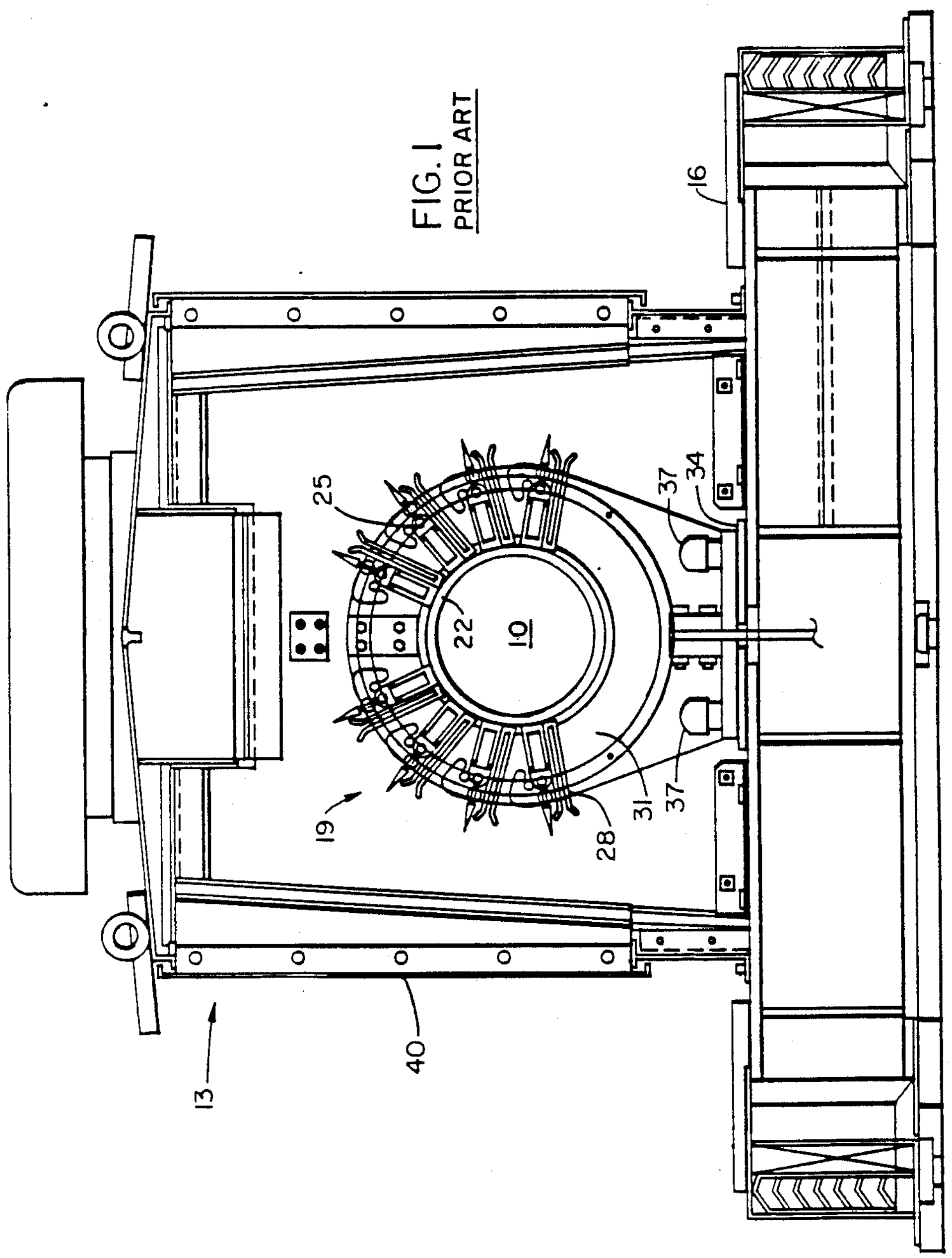
FIG. 1 PRIOR ART
FIG. 1 is a cross sectional view of a typical turbine generator collector housing.
Figure 2:
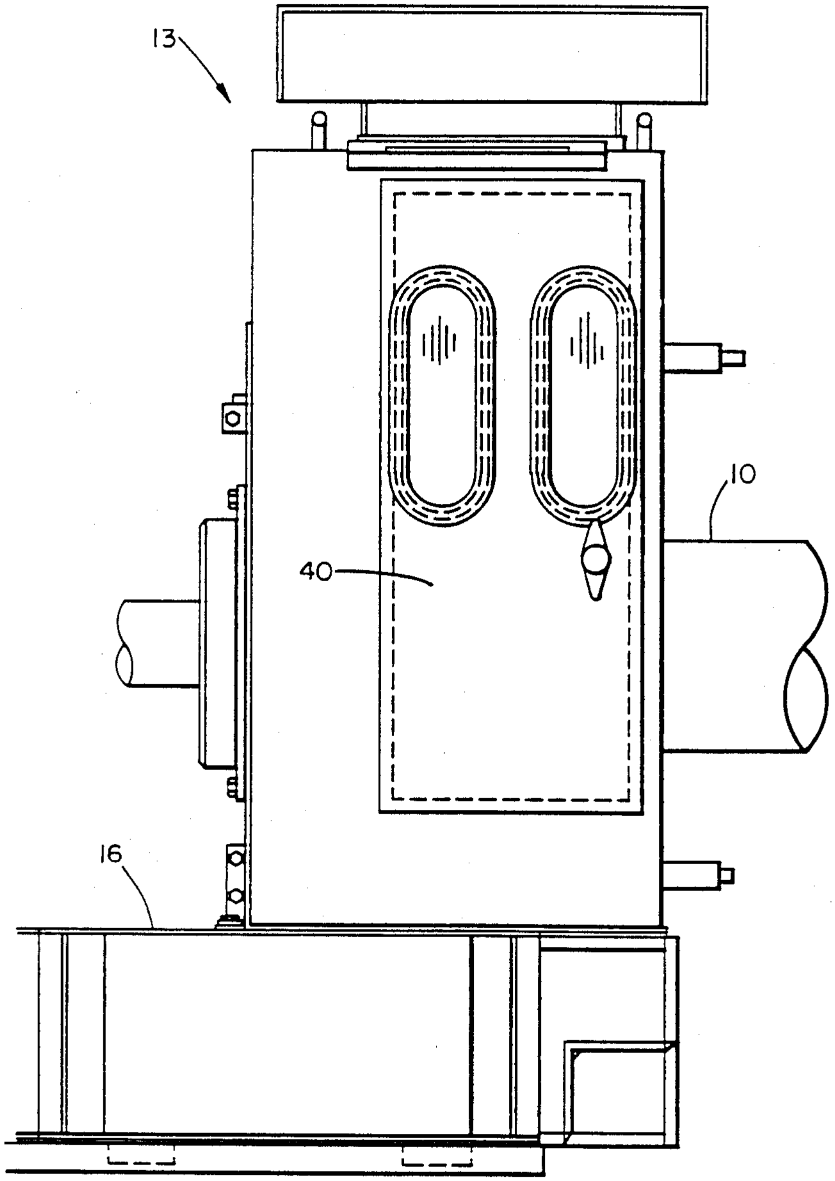
FIG. 2 PRIOR ART
FIG. 2 is a side view of the collector house of FIG. 1.

Referring now to the drawings in detail, FIGS. 1 and 2 show a portion of a dynamoelectric machine, such as a turbine driven electric power generator, having a rotor shaft 10 which passes through an enclosure commonly referred to as a collector house 13. A fixed base member 16 provides the floor of the collector house 13. The collector house 13 encloses a collector set 19 which includes one or more axially spaced collector rings 22 (one of which is shown in FIG. 1) mounted on and rotatable with the shaft 10. The collector set 19 includes one or more sets of carbon brushes 25 mounted angularly about, and in sliding contact with, one or more of the collector rings 22 by brush holders 28, to be more fully described hereinafter, which are supported by an annular plate 31, commonly referred to as a sickle, which is secured to the base member 16. The number of collector rings 22 and corresponding sets of brushes 25 is dependent upon the number of poles on the generator, thus comprising at least a pair of opposite polarity. The sickles 31 are electrically isolated from the base member 16 by an insulating pad 34 and have terminals 37 which extend through the base member 16 to engage electrical leads (not shown). In this manner, a DC electric current from an exciter (not shown) is transmitted to the generator rotor 10 to provide the magnetic field for the electrical generator.

Such a collector house is described in U.S. Pat. No. 4,713,566, issued on Dec. 15, 1987 which is assigned to the present assignee, and is incorporated herein by reference.

Figure 3:
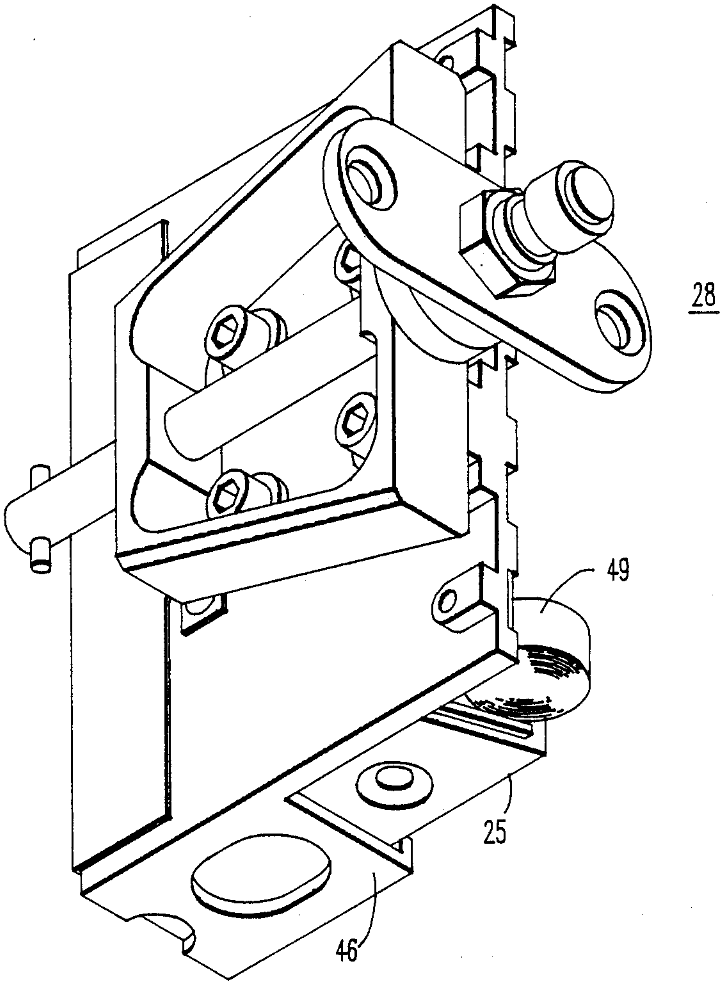
FIG. 3 is a perspective view of a magazine-type brush holder.

In some generators having large numbers of brushes 25, several brushes are ordinarily mounted or grouped in insulated cartridges which can be removed and replaced through the collector house 13 access doors 40 while the unit is in operation. An example of such a magazine-type brush holder 28 is shown in FIG. 3. Since relatively large currents can be flowing through the collector sets 19, it is important that contact not be made with both polarity units or with the collector set 19 and a grounded conductor at the same time, while removing the brush holder 28.

Figure 4:
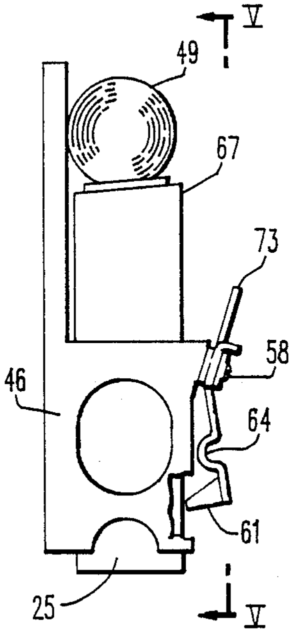
FIG. 4 is a side view of a brush box having a worn brush detector of the present invention.
Figure 5:
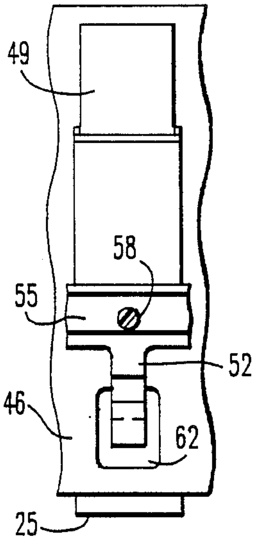
FIG. 5 is a view taken along the lines V—V of FIG. 4.
Figure 4A:
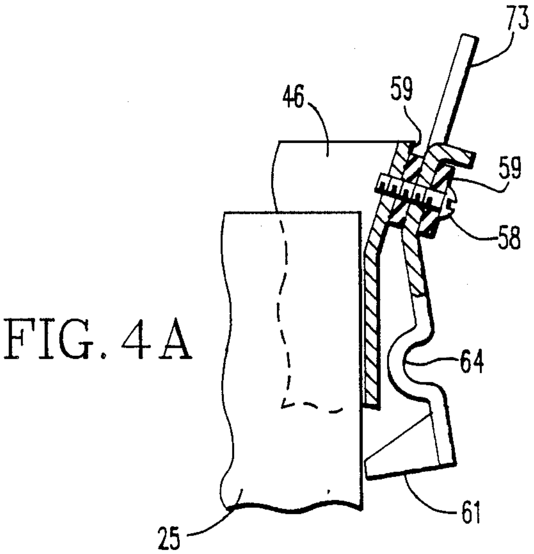
FIG. 4A is an enlarged view of a portion of the brush box shown in FIG. 4.

An improved brush holder 28 for carbon brush current collection system utilizing a worn brush detector 43 (FIG. 7) of the present invention is shown in FIGS. 4–6. In a typical magazine-type brush holder 28, a plurality of carbon brushes 25, on the order of six (6), are arranged within a generally rectangular brush box 46. The carbon brushes 25 are biased radially in the direction against the collector rings 22 (downward in the Figure) by a constant force coil spring 49. The electric means for detecting when a brush 25 has worn out (i.e., is shorter than a specified predetermined length) is provided by a set of contact fingers 52 which are attached to but insulated from the brush holder 28.

Preferably, the contact fingers 52 are arranged in the form of a contactor strip 55, shown in FIG. 7. The contactor strip 55, constructed of electrically-conductive material, is secured to the brush box 46, such as by bolting 58, and insulated 59 therefrom. A plurality of fingers 52, one per brush 25, project generally perpendicularly downward from the contactor strip 55 and each includes an insulated knob 61 on the end thereof. As shown in FIGS. 4 and 5, the insulated knob 61 projects through a hole 62 in the brush holder 28 and contacts the brush 25 when it is initially installed. In this manner a contact point 64 located on the finger 52 approximately midway between the contactor strip 55 and the knob 61 is pushed away from and out of contact with the brush box 46.

As shown in FIG. 6, however, when the brush 25 has worn down such that the top end 67 of the brush 25 is forced downward by the spring 49 past the location of the insulated knob 61, the finger 52 is forced inward and the contact point 64 on the contact finger 52 makes contact with the brush box 46. By attaching an electrical lead 70 to a connection point 73 on the contactor strip 55, an indication can be provided to an operator at a remote location of the condition when a brush 25 within a particular brush box 46 has worn out, thereby obviating the need for entering the collector house 13 during generator operation to conduct a brush inspection.

When the contactor strip 55 is first attached to and made part of the brush holder 28 when the brush holder 28 contains no brushes 25, the contact point 64 is already contacting the brush box 46. However, as shown in FIG. 4, when new brushes 25 are placed into the brush holder 28, the insulating knob 61 at the end of the contact fingers 52 forces the contact point 64 away from the brush box 46 thereby breaking contact. Only after the brush 25 has worn to the point 64 of allowing the knob 61 to slip over the end 67 of the brush 25 (FIG. 6) does the contact point 64 of the contactor strip 55 once again make contact with the brush holder 28. This contact with the brush box 46 thus energizes the contact finger 52, and hence the contactor strip 55. This condition can then be detected electronically or electrically by way of the electrical lead 70 and the worn brush condition indicated remotely.

In one embodiment of the present invention a single lead 70 can be attached to the contactor strip 55 at a connection point 73 which extends therefrom. The lead 70 is then run to a central terminal board (not shown) with leads from the other various brush holders 28 (when more than one brush holder is used) for use with appropriate indicating devices. For example, the leads 70 from the various brush boxes 46 can be run to a panel (not shown) of indicator lights 76, such as light emitting diodes (one of which is shown in FIG. 7), which are marked with an identifier and located to be visible from outside the collector house 13. In this manner, as soon as one of the brushes 25 in a given brush holder 28 has worn the predetermined amount, that condition and the location of the brush holder 28 containing the worn brush 25 would be indicated by the corresponding illuminated light 76. Thus, a worn brush 25 can be detected during a routine equipment check, obviating the need for an operator to periodically enter the collector house 13 while the generator is operating to visually inspect for worn brushes 25. When the worn brush 25 is indicated, the operator need only open the collector house door 40 so as to remove the particular brush holder 28 containing the worn brush 25 and then insert a brush holder 28 having new carbon brushes 25.

As a further enhancement, a relay (not shown) connected to the light panel can be activated by any light 76 being illuminated by an indication of a worn brush 25 and can remotely indicate that at least one brush holder 28 requires attention. After the operator's attention has been drawn to the fact that a brush holder 28 having a worn brush 25 has been indicated, he or she need only look at the light panel to see which brush holder 28 has the worn brush 25. This relay could be connected, for example, to an audio alarm 80 to more positively bring to attention of the operator that such a condition exists.

In a second embodiment of the present invention, it is possible to detect exactly which brush 25 is worn so that it can be removed. Instead of providing one lead 70 from the contactor strip 55, an individual electrical lead can be connected to each of the contact fingers 52 of the contactor strip 55. With this type of indicator, individual contact fingers 52, not necessarily connected by a contactor strip 55, can be utilized. In this manner, not only the location of the brush holder 28 is indicated, but the particular brush 25 that has worn down can be pointed out to the operator. This type of device can be used in collector systems wherein each individual brush 25 is supported about the collector ring 22, not grouped within a brush holder 28.

While specific embodiments of the invention have been described in detail, it will be appreciated by those skilled in the art that various modifications and alterations would be developed in light of the overall teaching of the disclosure. For example, the signal being used for the detection can be the DC voltage used for excitation, the voltage that is used for the ground detection, or a superimposed source specifically for the worn brush detector instrument. Additionally, the energizing voltage can be supplied by the static excitation system which typically exists for this type of collector system. Accordingly, the particular arrangements disclosed are meant to be illustrative only and not limiting as to the scope of the invention which is to be given the full breadth of the appended claims and in any and all equivalents thereof.

We claim:

1. In a dynamoelectric machine having a rotatable shaft, at least one collector ring mounted on the shaft and rotatable therewith, and a plurality of stationary carbon collector brushes angularly supported about said collector ring and in sliding contact therewith, said brushes being grouped in a least one removable holder such that a portion of said brushes are singularly removable from contact with said collector ring, and a worn brush detector for detecting when at least one of said grouped brushes within one of said removable holders has been worn down a predetermined amount, wherein said worn brush detector comprises:

a strip of electrically-conductive material secured to said removable holder;

at least one extending from said strip, said finger being disposed adjacent to a hole in said removable holder; and an electrically insulated knob on an end of each of said finger opposite to that of the strip and projecting through said hole such that when one of said brushes is inserted into said removable holder said finger is pushed away from said removable holder by the knob contacting one of the brushes, and when one of said brushes has worn down the predetermined amount it is disengaged from the knob so that the finger is caused to contact said removable holder whereby an electrical signal is generated.

2. The dynamoelectric machine as recited in claim 1, wherein said finger further comprises a projection thereon and disposed between the strip and the knob, the projection directed towards the removable holder thereby facilitating contact between said finger and the removable holder when one of said brushes has worn down the predetermined amount.

3. The dynamo electric machine as recited in claim 1, wherein said fingers are biased in a direction towards the removable brush holder.

4. The dynamoelectric machine as recited in claim 1, wherein the worn brush detector further comprises an electrical lead having one end connected to the strip and an opposite end connected to an electrical indicator, whereby the electrical signal is transmitted from the strip to indicator when one of said brushes within the removable holder has worn down the predetermined amount.

5. The dynamoelectric machine as recited in claim 2, wherein the worn brush detector further comprises an electrical lead having one end connected to the strip and an opposite end connected to an electrical indicator, whereby the electrical signal is transmitted from the strip to the indicator when one of said brushes within the removable holder has worn down the predetermined amount.

6. The dynamoelectric machine as recited in claim 5, wherein the electrical indicator of the worn brush detector indicator comprises a at least one light emitting diode and corresponding to each of said removable holder wherein the indication and location of said removable holder having one of said brushes worn the predetermined amount is displayed.

7. The dynamoelectric machine of claim 6, wherein the electrical indicator further includes an audio alarm activated when one said light emitting diodes is activated.

8. In an electric generator having a rotatable shaft, a pair of collector rings axially spaced on the shaft and rotatable therewith, and a plurality of stationary carbon collector brushes angularly supported about said collector rings and in sliding contact therewith, said brushes being grouped within at least one removable brush holder such that a portion of said brushes are singularly removable from contact with said collector rings, and a worn brush detector for detecting when at least one of said grouped brushes within one of said brush holders has been worn down a predetermined amount, wherein said worn brush detector comprises:

a contactor strip of electrically-conductive material secured to said brush holder;

a plurality of fingers projecting downward from the contactor strip and generally perpendicular thereto, one each of said fingers being disposed adjacent to a corresponding hole in said brush holder;

an electrically insulated knob on each of said fingers and disposed on an end opposite to that of the contactor strip and projecting through one of said holes; and a contact point on each of said fingers disposed between the contactor strip and the insulated knob and directed towards said brush holder, so that when one of said brushes is inserted into said brush holder the contact point is pushed away from said brush holder by the knob contacting one of the brushes, and when one of said brushes has worn down the predetermined amount it is disengaged from the knob such that the contact point is caused to contact said brush holder whereby the contactor strip is electrically energized.

9. The electric generator as recited in claim 8, wherein said fingers are biased in a direction towards said brush holder.

10. The electric generator as recited in claim 9, wherein the worn brush detector further comprises an electrical lead having one end connected to the contactor strip and an opposite end connected to an electrical indicator, whereby an electrical signal is transmitted from the electrically energized contactor strip to the indicator when one of said brushes within one of said brush holders has worn down the predetermined amount.

11. The electric generator as recited in claim 10, wherein the electrical indicator of the worn brush detector comprises a plurality of light emitting diodes, one light emitting diode for each brush holder, and arranged in a predetermined manner, whereby the indication and location of said brush holder having a brush worn the predetermined amount is displayed when the diode is activated by the electrically energized contactor strip.

12. The electric generator of claim 13, wherein the electrical indicator further includes an audio alarm activates when one of said light emitting diodes is activated to positively indicate when a brush worn the predetermined amount has been detected.

* * * * *